No. 859,617.
PATENTED JULY 9, 1907.
R. RIMMELIN.
MINNOW BUCKET.
APPLICATION FILED JUNE 27, 1904.
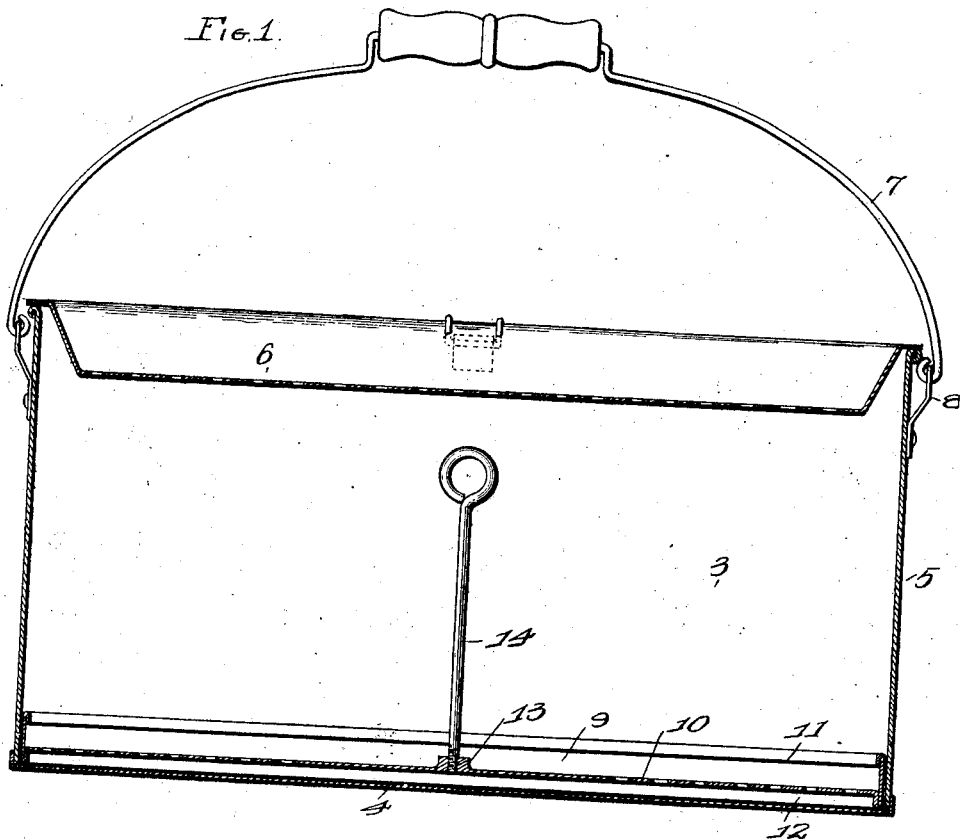
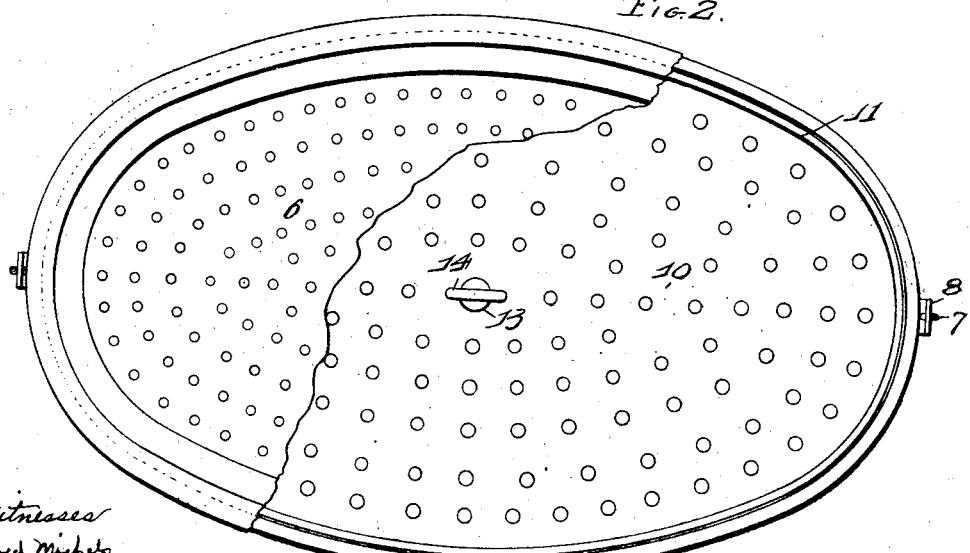

UNITED STATES PATENT OFFICE.

RICHARD RIMMELIN, OF ST. LOUIS, MISSOURI, ASSIGNOR OF ONE-FOURTH TO JOHN TWIST, ONE-FOURTH TO W. W. MARSHALL, AND ONE-EIGHTH TO WENTWORTH TERRY, OF ST. LOUIS, MISSOURI.

MINNOW-BUCKET.

No. 859,617.

Specification of Letters Patent.

Patented July 9, 1907.

Application filed June 27, 1904. Serial No. 214,243.

*To all whom it may concern:*

Be it known that I, RICHARD RIMMELIN, a citizen of the United States, residing at St. Louis, in the State of Missouri, have invented certain new and useful Improvements in Minnow-Buckets, of which the following is a specification, reference being had therein to the accompanying drawing.

My invention relates to improvements etc. in minnow buckets and consists of the novel features herein shown, described and claimed.

The object of my invention is to construct a minnow bucket with a removable auxiliary bottom whereby the minnows may be brought to the surface of the water in a receptacle by the raising of said bottom.

A further object is to refresh the minnows by raising and lowering the auxiliary bottom agitating the water and causing the air to be circulated through the water.

A further object is when the fisherman desires to pack his fish the handle of the auxiliary bottom is removed and let loosely in the receptacle thereby forming a clear and unobstructed receptacle.

In the drawings: Figure 1 is a vertical longitudinal sectional view of my invention. Fig. 2 is a top plan view of the same with a part of the upper cover removed showing the relative position of the auxiliary bottom within.

In the construction of the device as shown I provide a receptacle 3 comprising a bottom 4 and walls 5. A depressed perforated cover 6 is hingedly secured to the receptacle in the usual manner; a handle 7 for supporting the receptacle is connected thereto by means of the brackets 8.

An auxiliary bottom 9 is loosely placed within the receptacle and it consists of a perforated plate 10, its edge being bent upwardly and downwardly forming the flanges 11 and 12. At the center of the plate 10 is formed a boss 13 in which is screw-seated a stem or handle 14. The auxiliary bottom by means of the handle 14 is designed to be raised and lowered through the water in the receptacle causing a pumping action, agitating the water and creating a circulation of air there through to refresh the minnows thus dispensing with the usual supply of ice as is required for keeping the minnows alive. This action of agitating the water is only necessary at intervals and not continuous. The auxiliary bottom is also used to raise the minnows to the surface of the water in the receptacle so that the fisherman may readily and easily select the minnow without submerging the entire hand and coming in contact with the remaining minnows. The fisherman upon retiring removes the handle 14 by unscrewing it from the boss and laying it loosely in the bottom, he then packs his supply of fish in the same receptacle without obstruction.

A bucket of this construction dispenses with the common two part receptacle as is now in use and the inconvenience of carrying separately the various parts.

Having fully described my invention, what I claim is:

A minnow bucket comprising an elongated receptacle, a removable auxiliary perforated and flanged bottom located in the receptacle, said flange forming a wall projecting above and below the perforated auxiliary bottom, a handle removably attached to the auxiliary bottom for raising and lowering the same within the receptacle, substantially as specified.

In testimony whereof I affix my signature in presence of two witnesses.

RICHARD RIMMELIN.

Witnesses:
FRED. MICHELS,
HARRY BROWN.